US007004148B2

(12) United States Patent
Yokoi et al.

(10) Patent No.: US 7,004,148 B2
(45) Date of Patent: Feb. 28, 2006

(54) CONTROL APPARATUS FOR INTERNAL COMBUSTION ENGINE

(75) Inventors: Masahiro Yokoi, Kariya (JP); Taro Tabata, Kuwana (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/923,775

(22) Filed: Aug. 24, 2004

(65) Prior Publication Data

US 2005/0045156 A1    Mar. 3, 2005

(30) Foreign Application Priority Data

Aug. 26, 2003  (JP)  ............................. 2003-300772
Jul. 30, 2004  (JP)  ............................. 2004-222801

(51) Int. Cl.
*F02D 7/00* (2006.01)
(52) U.S. Cl. ................................. 123/481; 123/198 DB
(58) Field of Classification Search ................. 123/481, 123/198 DB, 198 F, 90.15, 90.11
See application file for complete search history.

(56) References Cited

U.S. PATENT DOCUMENTS 6,138,636 A      10/2000  Kohno et al.
6,332,446 B1 *   12/2001  Matsumoto et al. ..... 123/198 F
6,431,154 B1      8/2002  Inoue

FOREIGN PATENT DOCUMENTS

JP    03-085340    4/1991
JP    6-346711     12/1994

* cited by examiner

*Primary Examiner*—Mahmoud Gimie
(74) *Attorney, Agent, or Firm*—Nixon & Vanderhye P.C.

(57) ABSTRACT

During cylinder cut-off in which fuel injection for some cylinder(s) is halted, a variable valve operation mechanism or the halted cylinder is controlled based on an operating state of the engine whereby engine vibration is reduced during cylinder cut-off operation. The variable valve operation mechanism may be controlled based on a maximum internal pressure of a combustion cylinder in which fuel injection is continued during the cylinder cut-off operation.

14 Claims, 7 Drawing Sheets

| Gn(g/rev)<br>PP2tg<br>(kPa) | 0.3 | 1 | 2 | 3 |
|---|---|---|---|---|
| 100 | 0 | −20 | −50 | −100 |
| 500 | 0 | | | −80 |
| 1000 | 0 | VTtg (°CA) | | −30 |
| 2000 | 20 | 10 | 10 | −20 |
| 3000 | 30 | 20 | 20 | 0 |

Ne=3000 (rpm)

Ne=····

Ne=····

CONTROL APPARATUS FOR INTERNAL COMBUSTION ENGINE

CROSS REFERENCE TO RELATED APPLICATION

This application is based on Japanese Patent Applications Nos. 2003-300772 filed on Aug. 26, 2003, and 2004-222801 filed on Jul. 30, 2004, the disclosure of which is incorporated herein by reference.

FIELD OF THE INVENTION

The present invention relates to a control apparatus for an internal combustion engine performing a cylinder cut-off operation to halt combustion of a part of the cylinders according to an operating state of the internal combustion engine and to operate the internal combustion engine with the remaining combustion cylinders.

BACKGROUND OF THE INVENTION

Recently, in vehicles equipped with an internal combustion engine, it has been known to perform cylinder cut-off operation to halt fuel injection for a part of cylinders in a relatively low load condition and to operate the internal combustion engine with the remaining cylinders for the benefit of improving fuel consumption of the internal combustion engine (for example, Japanese laid open patent publication No. JP 3-85340.)

However, as shown in FIG. 2B, during the cylinder cut-off operation, a maximum internal pressure P2 of a halted cylinder which is halted from combustion by halting fuel injection becomes considerably lower than a maximum internal pressure of a combustion cylinder which is performed fuel injection. Consequently, the difference $\Delta P$ (=P1−P2) of the maximum internal pressures between the combustion cylinder and the halted cylinder becomes larger (FIG. 4). Therefore, it causes the problem that the difference of the generated torques between the combustion cylinder and the halted cylinder becomes larger, and the torque of the crank shaft fluctuates during the cylinder cut-off operation, and the rotational fluctuation becomes larger, and then, vibration of the internal combustion engine becomes larger.

To overcome the above mentioned problem, it is proposed that intake valves of halted cylinders are maintained at a closed position in all strokes during the cylinder cut-off operation and exhaust valves of the halted cylinders are opened in intake stroke and exhaust stroke and are closed in compression stroke and expansion stroke so that exhaust gas is emitted from the halted cylinders through the exhaust ports after the gas is sucked into the halted cylinders through the exhaust ports, compressed and expanded in the halted cylinders.

In this way, with sucking and compressing the exhaust gas whose pressure is higher than intake air, in the halted cylinders during the cylinder cut-off operation, the maximum internal pressures of the halted cylinders P2 are maximized and the difference $\Delta P$ (=P1−P2) of the maximum internal pressures between the combustion cylinder and the halted cylinder is minimized, for reducing vibration of the internal combustion engine during the cylinder cut-off operation (for example, Japanese laid open patent publication No. JP 2001-132484.)

However, in accordance with a recent study of the inventors of this invention, it was found that it was not the best way just to maximize the maximum internal pressure P2 of the halted cylinder for reducing vibration of the internal combustion engine effectively during the cylinder cut-off operation, and that when the maximum value of a combined waveform of internal pressures of all of the halted cylinders at that time and the maximum internal pressure of the combustion cylinder P1 were balanced, vibration of the internal combustion engine would be effectively reduced during the cylinder cut-off operation.

For example, as shown in FIG. 5, in the case that the engine was an in-line four-cylinder engine, the number of the halted cylinder was two cylinders during the cylinder cut-off operation and a maximum internal pressure of #1 cylinder and a maximum internal pressure of #4 cylinder were equal, it was found that vibration of the internal combustion engine would be effectively reduced during the cylinder cut-off operation when a total value of the maximum internal pressures P2 of the two halted cylinders at that time and the maximum internal pressure P1 were equal (when formula P1=P2×2 was satisfied).

Furthermore, the combustion pressure of the combustion cylinder changes in accordance with change of operating state of the internal combustion engine during the cylinder cut-off operation, and the maximum internal pressure P1 of the combustion cylinder changes. As a result, a proper maximum internal pressure P2 of the halted cylinder, which is needed to reduce vibration of the internal combustion engine, changes. The number of the halted cylinders during the cylinder cut-off operation also changes the proper maximum internal pressure P2 of the halted cylinder.

However, in the Japanese laid open patent publication No. JP 2001-132484, the control pattern of the exhaust valves of the halted cylinders is not changed even if the operating state of the internal combustion engine (the combustion pressure of the combustion cylinder) changed during the cylinder cut-off operation. Consequently, it is not capable of changing the maximum internal pressure of the halted cylinder purposefully even if the operating state of the internal combustion engine and/or the combustion pressure of the combustion cylinder changed. Therefore, depending on the operating state of the internal combustion engine during cylinder cut-off operation, it can be occurred that the difference between the maximum internal pressure P1 of the combustion cylinder and the total value of the maximum internal pressures of all of the halted cylinders becomes larger. Consequently, vibration of the internal combustion engine becomes larger, and as a result, stable vibration-reduction effect is not obtained.

SUMMARY OF THE INVENTION

The present invention is made in view of the foregoing matter and it is an object of the present invention to provide a control apparatus of an internal combustion engine capable of obtaining stable vibration-reduction effect regardless of operating state of the internal combustion engine (combustion pressure of a combustion cylinder) during cylinder cut-off operation.

In accordance with an engine control apparatus of an internal combustion engine of the present invention, valve control means controls a variable valve operation mechanism of a halted cylinder which is halted injecting fuel, based on an engine operating state or a maximum internal pressure of a combustion cylinder during the cylinder cut-off operation.

Although a proper internal pressure, which is needed to reduce engine vibration, of the halted cylinder changes in accordance with engine operating states, it is capable of reducing the engine vibration by controlling the variable valve operation mechanism based on the engine operating state or the maximum internal pressure of the combustion cylinder as the variable valve operation mechanism controls the internal pressure of the halted cylinder so that the internal pressure of the halted cylinder corresponds to the proper internal pressure at that time in the engine operating state.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 1:
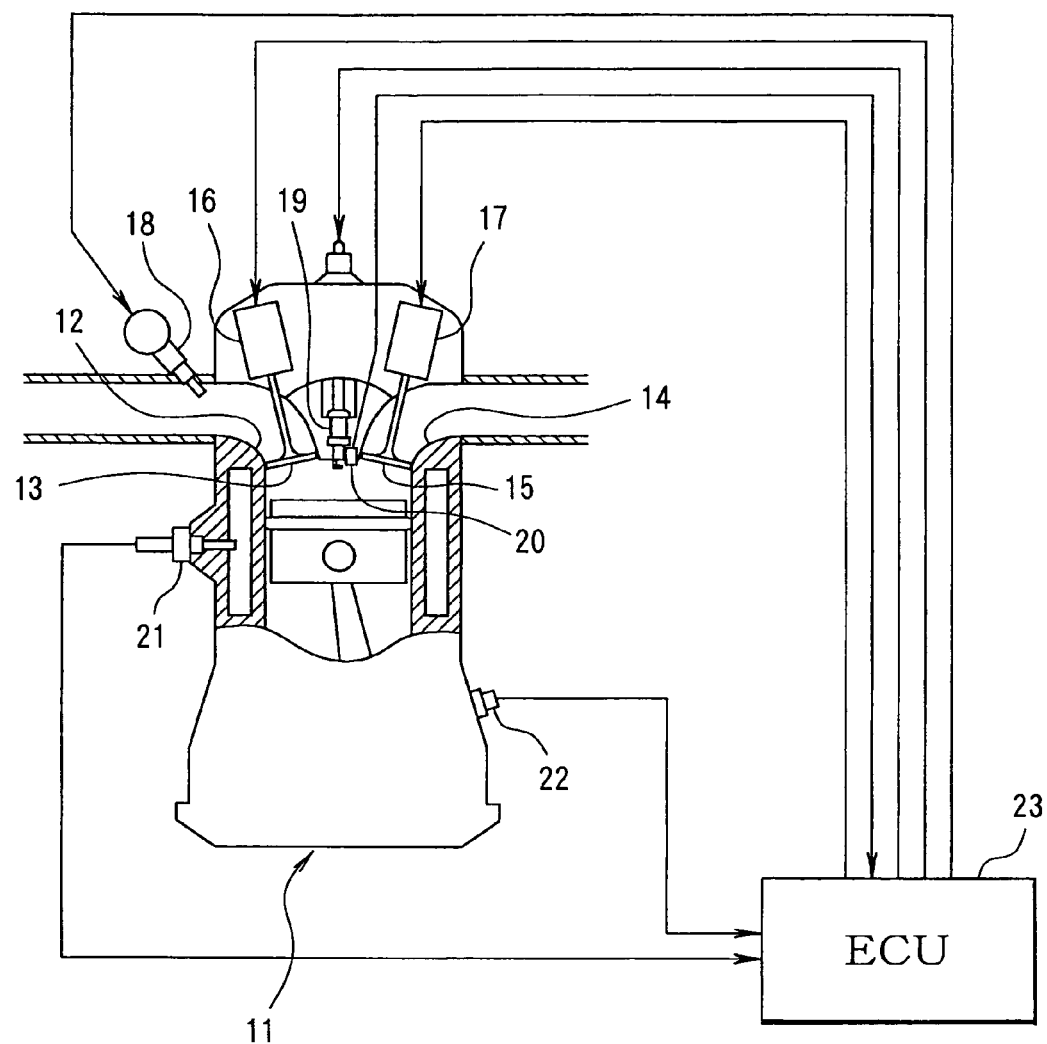
FIG. 1 is a schematic diagram of a structure of an engine control system in accordance with the first embodiment of the present invention.

The first and second embodiment applied the present invention to an intake port injection type, in-line four-cylinder engine will be hereinafter described.

<First Embodiment>

The first embodiment of the present invention is described with reference to FIGS. 1 through 8. At first, a schematic structure of an engine control system will be explained with reference to FIG. 1. In an in-line four-cylinder engine 1 as an example of internal combustion engines, an electromagnetic actuating type intake valve 13 is provided at an intake port 12 of each cylinder and an electromagnetic actuating type exhaust valve 15 is provided at an exhaust port 14 of each of the cylinders. The intake valves 13 and the exhaust valves 15 are directly actuated with electromagnetic power of solenoids of electromagnetic actuating apparatuses 16, 17 respectively.

A fuel infection valve 18 for injecting fuel to each of the cylinders is provided in the vicinity of the intake port 12 of each of the cylinders. An ignition plug 19 is provided for each of the cylinders in a cylinder head of the engine 11 for igniting air-fuel mixture in each of the cylinders by spark discharge.

Furthermore, an internal pressure sensor 20 for detecting internal pressure of a cylinder is provided on the cylinder head of the engine 11. The internal pressure sensor 20 may be provided for each of the cylinders. In addition, the internal pressure sensors 20 may be provided for one of the cylinders to be combusted cylinder during the cylinder cut-off operation and one of the cylinders to be halted from combustion in case that the combustion cylinders and the halted cylinders are predetermined. Furthermore, an internal pressure sensor combined with an ignition plug may be provided.

A coolant temperature sensor 21 for detecting a coolant temperature and a crank angle sensor 22 for outputting a pulse signal at a constant rotation angle (for example, 30 degree crank angle (°CA)) of a crankshaft are provided on the cylinder block of the engine 11. Crank angles and/or engine speeds are detected based on the output signal of the crank angle sensor 22.

Outputs of the various sensors described above are input into an engine control unit (ECU) 23. The ECU 23 is mainly composed of a microcomputer, and controls fuel injection amounts injected from injectors 18 and ignition timings ignited by ignition plugs 19 in accordance with operating state of the engine 11 by implementing the various engine control programs stored in a Read Only Memory (ROM) embedded in the ECU 23.

Figure 3:
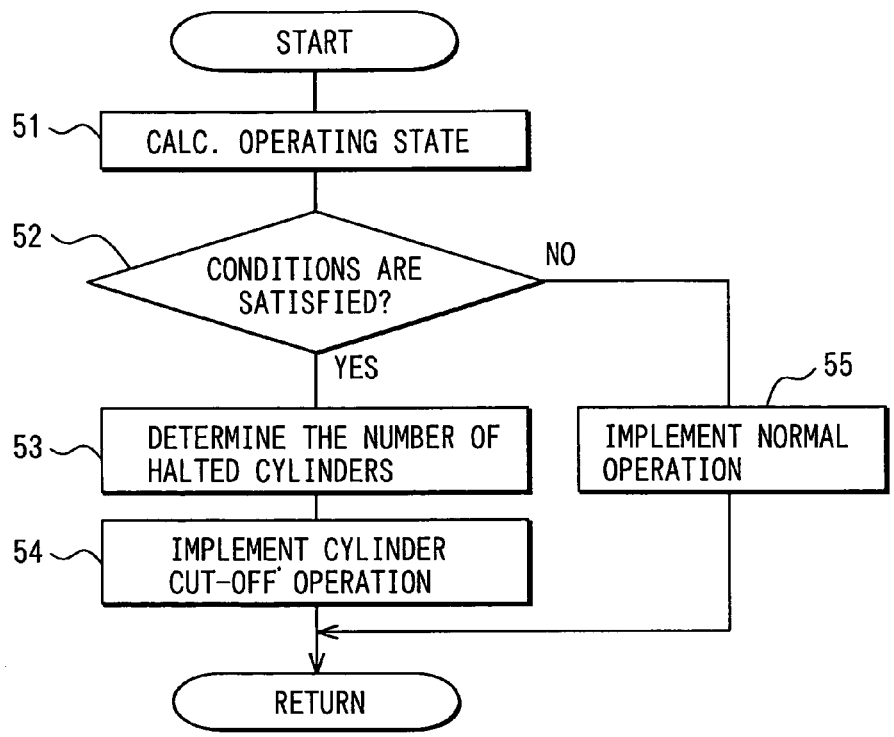
FIG. 3 is a flow chart showing a flow of processing steps of cylinder cut-off operation program.

Furthermore, for improving fuel consumption of the engine 11, the ECU 23 implements a cylinder cut-off operation control program shown in FIG. 3 for changing operation state between full cylinder operation and cylinder cut-off operation in accordance with operating state of the engine. The ECU 23 operates the engine 11 by injecting fuel from all of the injectors during the full cylinder operation. On the other hand, the ECU 23 operates the engine 11 by halting fuel injection for a part of all of the cylinders, for example, for two cylinders and operates the engine 11 with the remaining cylinders during the cylinder cut-off operation.

The processing steps of the cylinder cut-off operation control program will be explained below with reference to FIG. 3.

This program is implemented, for example, at a predetermined interval after turning on an ignition switch. When this program is initiated, operating state of the engine is calculated at first in step 51. For example, a load of the internal combustion engine (e.g. intake air amount) and an engine speed are calculated as the operating state of the engine. Other information instead of or addition to the above operating state may be calculated.

After that, the process is advancing to step 52 to determine whether conditions of the cylinder cut-off operation are satisfied or not, using the operating state of the engine detected in step 51. When it is determined that the conditions of the cylinder cut-off operation are satisfied in step 52, the process advances to step 53. In step 53, the number of the halted cylinders to be halted injecting fuel is determined based on the operating state of the engine detected in step 51. In short, the number of the cylinder to be halted from combustion is determined. In this embodiment, the number of the halted cylinders is set to "one cylinder" or "two cylinders" based on the operating state of the engine. After that, the process advances to step 54 to perform the cylinder cut-off operation halting fuel injection for the halted cylinders and infecting fuel for the remaining cylinders.

On the other hand, when it is determined that the conditions of the cylinder cut-off operation are not satisfied in step 52, the process advances to step 55 to implement a normal operation (full cylinder operation) injecting fuel for all of the cylinders to run the engine 11.

As described above, the cylinder cut-off operation halting fuel injection for a part of the cylinders in accordance with the operating state of the internal combustion engine and operating the engine with the remaining cylinders is implemented.

Figure 2A:
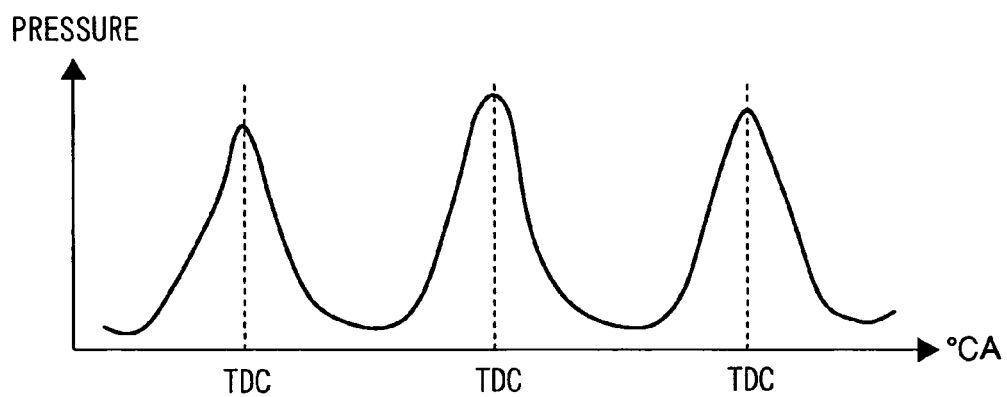
FIG. 2A is a waveform diagram of internal pressure of a cylinder in full cylinder operation.
Figure 2B:
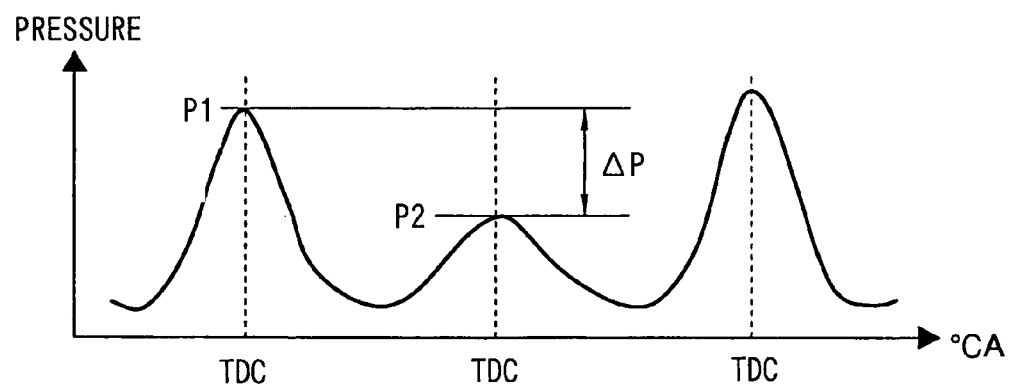
FIG. 2B is a waveform diagram of internal pressure of a cylinder in cylinder cut-off operation.

However, the difference $\Delta P(=P1-P2)$ of maximum internal pressures between the combustion cylinder and the halted cylinder becomes larger in case that intake valves 13 and exhaust valves 15 of the halted cylinder to be halted injecting fuel are operated during the cylinder cut-off operation as the same pattern as the one during the full cylinder operation, as the maximum internal pressure P2 of the halted cylinder becomes considerably lower than the maximum internal pressure P1 of the combustion cylinder to be injected fuel during the cylinder cut-off operation as shown in FIG. 2B.

Figure 4:
FIG. 4 is a block diagram to explain a mechanism of engine vibration generation during cylinder cut-off operation.
Figure 5A:
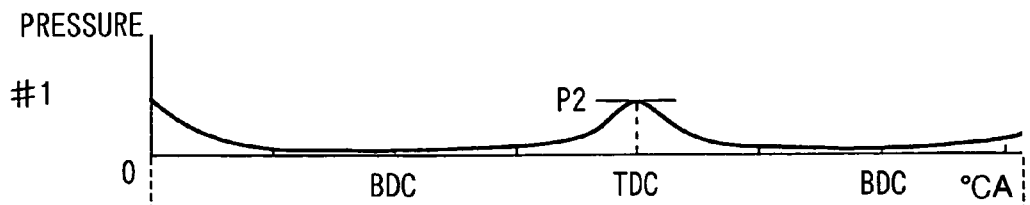
FIG. 5A is a waveform diagram of internal pressure of #1 cylinder.
Figure 5B:
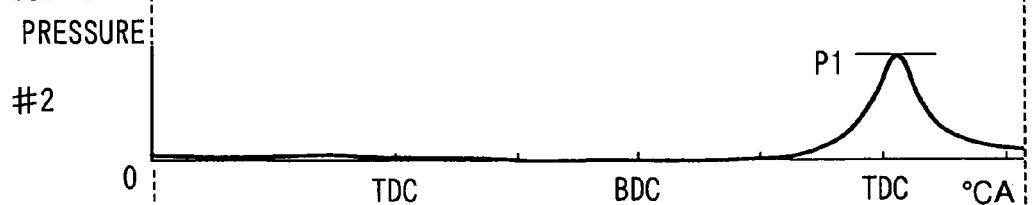
FIG. 5B is a waveform diagram of internal pressure of #2 cylinder.
Figure 5C:
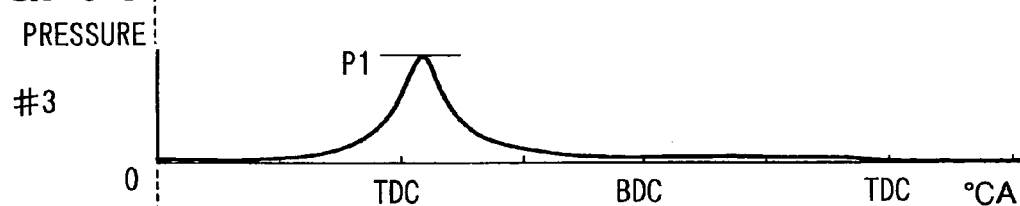
FIG. 5C is a waveform diagram of internal pressure of #3 cylinder.
Figure 5D:
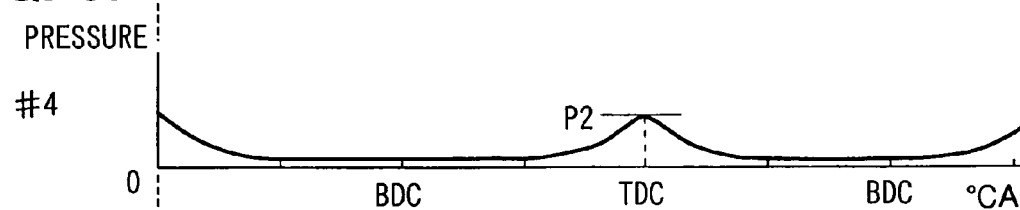
FIG. 5D is a waveform diagram of internal pressure of #4 cylinder.
Figure 5E:
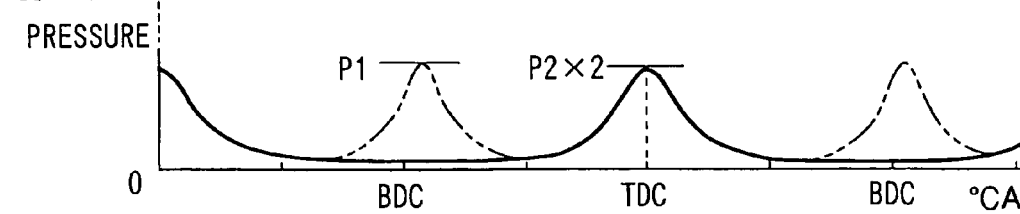
FIG. 5E is a waveform diagram of combined internal pressure of all halted cylinders.

As shown in FIG. 4, as the difference $\Delta p$ of the maximum internal pressures between the combustion cylinder and the halted cylinder becomes large, the difference of the generated torques between the combustion cylinder and the halted cylinder becomes large. As the difference of the generated torques becomes large, torque fluctuation of a crankshaft, then a rotational variation of the crankshaft becomes large. And as the rotational variation of the crankshaft becomes large, vibration of the internal combustion engine 11 becomes large. Therefore, in conventional cylinder cut-off operation, there is a problem that the engine vibration during the cylinder cut-off operation becomes larger than the one during full cylinder operation.

To overcome this problem, during the cylinder cut-off operation, the ECU 23 opens the exhaust valves of the halted cylinders in intake stroke and closes the exhaust valves of the halted cylinders in compression stroke, expansion stroke and exhaust stroke with the electromagnetic actuating apparatuses 17 while the ECU 23 maintains closed state of the intake valves 13 of the halted cylinders in all strokes with the electromagnetic actuating apparatuses 16. At this time, the ECU 23 may open the exhaust valves of the halted cylinders in expansion stroke and close the exhaust valves of the halted cylinders in compression stroke, exhaust stroke and intake stroke. The ECU 23 may open the exhaust valves of the halted cylinders in intake stroke and expansion stroke, and close the exhaust valves of the halted cylinders in compression stroke and exhaust stroke.

Herein, intake stroke, compression stroke, expansion stroke and exhaust stroke of the halted cylinder mean strokes in the period when the cylinder is in the combustion state and, of course, necessarily do not mean to suck, compress, expand and emit exhaust gas during the cylinder cut-off operation.

In this manner, the ECU 23 controls the valves 13, 15 so as to make the maximum internal pressure large due to sucking and compressing higher pressure exhaust gas than intake air.

By the way, according to a study of the inventors of this invention, it was found that it was not the best way just to maximize a maximum internal pressure P2 of the halted cylinder for reducing vibration of the internal combustion engine effectively during the cylinder cut-off operation.

As shown in FIG. 5, as an example, it is explained the case of an in-line four-cylinder engine 11 and the number of the halted cylinder is two cylinders during the cylinder cut-off operation. In FIG. 5, #1 cylinder and #4 cylinder are halted cylinders. The maximum internal pressure of #1 cylinder and the maximum internal pressure of #4 cylinder are equal (P2). In such a case, it was found that when a maximum internal pressure (P1) of one combustion cylinder and a maximum value of a combined waveform of pressures in all of the halted cylinders at that time are equal, that is, a relationship of formula (1) shown below is satisfied, it is capable of reducing vibration of the engine 11 during the cylinder cut-off operation effectively.

$$P2 \times 2 = P1 \qquad (1)$$

Accordingly, in the first embodiment, the valve closed timing of the exhaust valves 15 of the halted cylinders in intake stroke is controlled in accordance with an actual maximum internal pressure of the combustion cylinder detected by the internal pressure sensor 20. To be more specific, the ECU 23 implements the variable valve operating amount control program for the halted cylinders in FIG. 6. In other words, when the number of the halted cylinders is two, ECU 23 calculates a maximum internal pressure P2 of the halted cylinder which satisfies the relationship of the above formula (1) as the proper internal pressure of the halted cylinder, using the actual maximum internal pressure P1 of the combustion cylinder detected by the internal pressure sensor 20, and sets this proper internal pressure of the halted cylinder as the target maximum internal pressure P2tg. Herein, the proper internal pressure means the maximum internal pressure which is needed for reducing engine vibration effectively. After that, the ECU 23 sets the target valve closed timing VTtg of the exhaust valve 15 in intake stroke of each of the halted cylinders so that the actual maximum internal pressure P2 of the halted cylinder detected by the internal pressure sensor 20 corresponds to the target maximum internal pressure P2tg (=the proper internal pressure), and controls the electromagnetic apparatus 17 of the exhaust valve 15 so that the valve closed timing VT of the exhaust valve 15 corresponds to the target valve closed timing VTtg in intake stroke of each of the halted cylinders.

Hereinafter, the process steps of the variable valve operating amount control program of the halted cylinder shown in FIG. 6 will be explained. This program is implemented, for example, at a predetermined interval after turning on an ignition switch (not shown). After the program is initiated, at first it is determined whether the cylinder cut-off operation is being implemented or not in step 101. In this step, it is determined the cylinder cut-off operation is being implemented when combustion of at least one cylinder is halted purposefully (when the fuel injection is halted for at least one cylinder). In this embodiment, the number of the halted cylinders is set to "one cylinder" or "two cylinders".

When it is determined that the cylinder cut-off operation is being implemented in this step 101, the process advances to step 102. After counting the number N of the combustion cylinders in step 102, the process advances to step 103 to detect an actual maximum internal pressure P1 of a combustion cylinder by the internal pressure sensor 20.

After that, the process advances to step 104 to determine whether it is possible to detect a plurality of actual maximum internal pressures of the combustion cylinders or not. When it is determined that it is possible to detect a plurality of the actual maximum internal pressures of the combustion cylinders, the process advances to step 105 to set the average of all of the actual maximum internal pressures of the combustion cylinders to an actual maximum internal pressure of the combustion cylinder.

On the other hand, when it is determined that it is impossible to detect a plurality of the actual maximum internal pressures of the combustion cylinders in step 104, one actual maximum internal pressure of the combustion cylinder detected in above step 103 is adopted as it is.

After that, the process advances to step 106 to calculate the target maximum internal pressure P2*tg* of the halted cylinder with the following formula, using the actual maximum internal pressure P1 of the combustion cylinder.

$$P2tg = P1 \times 1/(4-N)$$

Wherein "N" is the number of the combustion cylinders counted in step 102 and the number of the halted cylinders is determined by subtracting the number of the combustion cylinders from the number of all of the cylinders (the number of all of the cylinder is four in this embodiment). In this manner, for example, in case the number of the halted cylinder is two, P2*tg* is equal to P1×½ and the proper internal pressure which is the maximum internal pressure of the halted cylinder satisfying the relationship of the aforementioned formula (1) is calculated as the target maximum internal pressure P2*tg* of the halted cylinder. Herein, the proper internal pressure means the maximum internal pressure of the halted cylinder which is needed for reducing vibration of the engine 11 effectively.

After the target maximum internal pressure P2*tg* of the halted cylinder is calculated, the process advances to step 107 to set a final target internal pressure PP2*tg* of the halted cylinder by correcting the target internal pressure P2*tg* of the halted cylinder with an feedback correction amount P2*fb*.

$$PP2tg = P2tg + P2fb$$

Figures 7, 8:
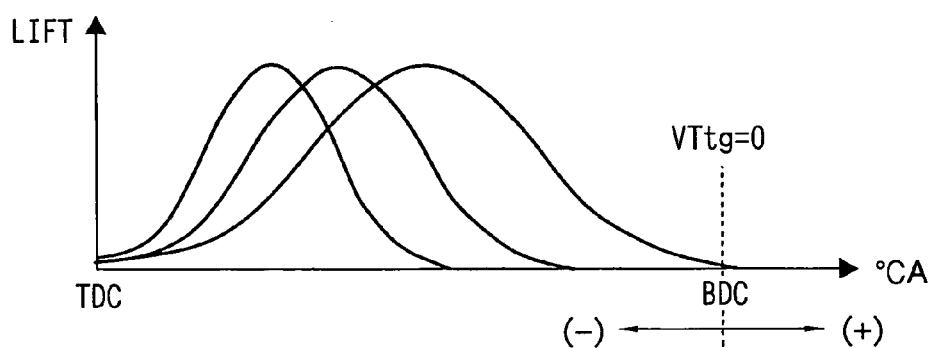
FIG. 7 is a map conceptually showing target valve closing timing VTtg of exhaust valve.
FIG. 8 is a explanation chart to explain target valve closing timing VTtg of exhaust valve.

After that, the process advances to step 108 to calculate a target valve closed timing VTtg of the exhaust valve 15 in intake stroke of the halted cylinder in accordance with an engine speed Ne, a load of the combustion cylinder (e.g. intake air amount) Gn and the final target internal pressure PP2*tg* of the halted cylinder with a map shown in FIG. 7. The target valve closed timing VTtg of the exhaust valve 15 is calculated considering the engine speed Ne and the load Gn of the combustion cylinder as the internal pressure of the halted cylinder is also affected by the engine speed Ne and the load Gn of the combustion cylinder.

As shown in FIG. 7, the map of the target valve closed timing VTtg of the exhaust valve 15 is a two-dimensional map whose parameters are the load Gn of the combustion cylinder and the final target internal pressure PP2*tg* of the halted cylinder, and the two-dimensional map is provided with respect to each engine speed range. The target valve closed timing VTtg of the exhaust valve 15 is previously set in each of the maps, using experimental data and design data and so on, so as to achieve the target maximum internal pressure P2*tg* of the halted cylinder. The maps are stored in the ROM of the ECU 23.

The target valve closed timing VTtg of the exhaust valve 15 in intake stroke of the halted cylinder shown in FIG. 8, for example, is expressed in crank angle in which the retard side to the bottom dead center (BDC) which is set as a zero point is plus and forward side to the BDC is minus. As understood from FIG. 8, basically, since the amount of exhaust gas sucked into a cylinder becomes larger as the valve closed timing is closer to the BDC, it is possible to create a high maximum internal pressure. Accordingly, the map of the target valve closed timing shown in FIG. 7 is formed in response to such a principle.

In this manner, after the target valve closed timing VTtg of the exhaust valve 15 in intake stroke of the halted cylinder is calculated, the process advances to step 109 to control the electromagnetic actuating apparatuses 17 of the exhaust valves so that the valve closed timing VT of the exhaust valve 15 in intake stroke of the halted cylinder corresponds to the target valve closed timing VTtg.

After that, the process advances to step 110 to detect an actual maximum internal pressure P2 of the halted cylinder by the internal pressure sensor 20. And after that, the process advances to step 111 to calculate the feedback correction amount P2*fb* with the following formula, corresponding to the difference between the target maximum internal pressure P2*tg* and the actual maximum internal pressure P2.

$$P2fb = k \times (P2tg - P2)$$

Wherein k is a feedback gain.

Therefore, the target valve closed timing VTtg of the exhaust valve 15 is set so that the actual maximum internal pressure P2 of the halted cylinder detected by the internal pressure sensor 20 corresponds to the target maximum internal pressure P2*tg* as the feedback correction amount P2*fb* is reflected at the time of next calculation of the target valve closed timing VTtg of the exhaust valve 15.

In the first embodiment described above, the target valve closed timing VTtg of the exhaust valve 15 in intake stroke of the halted cylinder is set based on the maximum internal pressure of the combustion cylinder during the cylinder cut-off operation and the valve closed timing VT of the exhaust valve is controlled. Therefore, as the valve closed timing VT of the exhaust valve 15 of the halted cylinder is purposefully changed corresponding to the maximum internal pressure P1 of the combustion cylinder during the cylinder cut-off operation, it is possible to change the maximum internal pressure P2 of the halted cylinder purposefully.

In this manner, it is possible to change the maximum internal pressure P2 of the halted cylinder to the proper internal pressure in response to the change of the proper internal pressure of the halted cylinder corresponding to the maximum internal pressure of the combustion cylinder during the cylinder cut-off operation, and obtain stable vibration-reduction effect regardless of operating state of the internal combustion engine.

Furthermore, in the first embodiment, since the target maximum internal pressure P2*tg* of the halted cylinder (=proper internal pressure) is calculated based on the actual maximum internal pressure P1 of the combustion cylinder detected by the internal pressure sensor 20 during the cylinder cut-off operation, and the target valve closed timing VTtg of the exhaust valve 15 of the halted cylinder is set so that the actual maximum internal pressure P2 of the halted cylinder detected by the internal pressure sensor 20 corresponds to the target maximum internal pressure P2*tg*, the target maximum internal pressure P2*tg* of the halted cylinder (=proper internal pressure) is precisely calculated and the actual maximum internal pressure P2 of the halted cylinder is precisely controlled to the target maximum internal pressure P2*tg* of the halted cylinder (=proper internal pressure).

<Second Embodiment>

The second embodiment of the present invention is described with reference to FIGS. 9 and 10.

While the target valve closed timing VTtg of the exhaust valve 15 in intake stroke of the halted cylinder is set based on the maximum internal pressure P1 of the combustion cylinder during the cylinder cut-off operation in the first embodiment, the target valve closed timing VTtg of the exhaust valve 15 in intake stroke of the halted cylinder is set based on at least one of the number of the halted cylinders during the cylinder cut-off operation, a load of the combustion cylinder, an ignition timing of the combustion cylinder, an exhaust gas recirculation (EGR) amount of the combustion cylinder, information related to the EGR amount of the combustion cylinder, an engine temperature and information related to the engine temperature in the second embodiment.

Since the proper internal pressure changes in accordance with the number of the halted cylinders during the cylinder cut-off operation, the number of the halted cylinders is a parameter to determine a proper internal pressure of the halted cylinder. In addition, since the internal pressure of the combustion cylinder changes in accordance with the load, the ignition timing and the EGR amount of the combustion cylinder, and furthermore, the change of the combustion temperature causes the change of the engine temperature, any of the load of the combustion cylinder, the ignition timing of the combustion cylinder, the EGR amount of the combustion cylinder, the information related to the EGR amount, the engine temperature and the information related to the engine temperature is the information in substitution for the internal pressure of the combustion cylinder. Consequently, the information in substitution for the internal pressure of the combustion cylinder is also the parameter to determine the proper internal pressure of the halted cylinder.

Accordingly, if the target valve closed timing VTtg of the exhaust valve 15 in intake stroke of the halted cylinder is set using these parameters to determine the proper internal pressure of the halted cylinder as the information of the engine operating state during the cylinder cut-off operation, the target valve closed timing VTtg of the exhaust valve 15 of the halted cylinder which is needed to change the internal pressure of the halted cylinder corresponding to the change of the proper internal pressure of the halted cylinder can be precisely set.

In the second embodiment described below, the process steps of the variable valve operating amount control program of the halted cylinder shown in FIG. 9 implemented by the ECU 23 will be explained. After the program is initiated, at first it is determined whether the cylinder cut-off operation is being implemented or not in step 201. When it is determined that the cylinder cut-off operation is being implemented in step 201, the process advances to step 202 to count the number N of the combustion cylinders. Hereby, the number of the halted cylinders is calculated (the number of all of the cylinders–N).

After that, the process advances to step 203 to calculate an average value from the detected value at each of the cylinders, regarding the load of the combustion cylinder (e.g. intake air amount) Gn, the ignition timing of the combustion cylinder Es, the EGR amount of the combustion cylinder Eg, the information related to the EGR amount (e.g. opening degree of the EGR valve, valve timing of the intake valve 13 of the combustion cylinder and valve timing of the exhaust valve 15 of the combustion cylinder) Eg, the engine temperature Tc and the information related to the engine temperature (e.g. coolant temperature, etc.) Tc.

After that, the process advances to step 204 to calculate the target maximum internal pressure P2$tg$ of the halted cylinder (=proper internal pressure) with a map or a formula or etc. based on at least one of the number of the halted cylinders (the number of all of the cylinders–N), the load of the combustion cylinder Gn, the ignition timing of the combustion cylinder Es, the EGR amount of the combustion cylinder Eg, the information related to the EGR amount Eg, the engine temperature Tc and the information related to the engine temperature Tc.

Figures 9, 10:
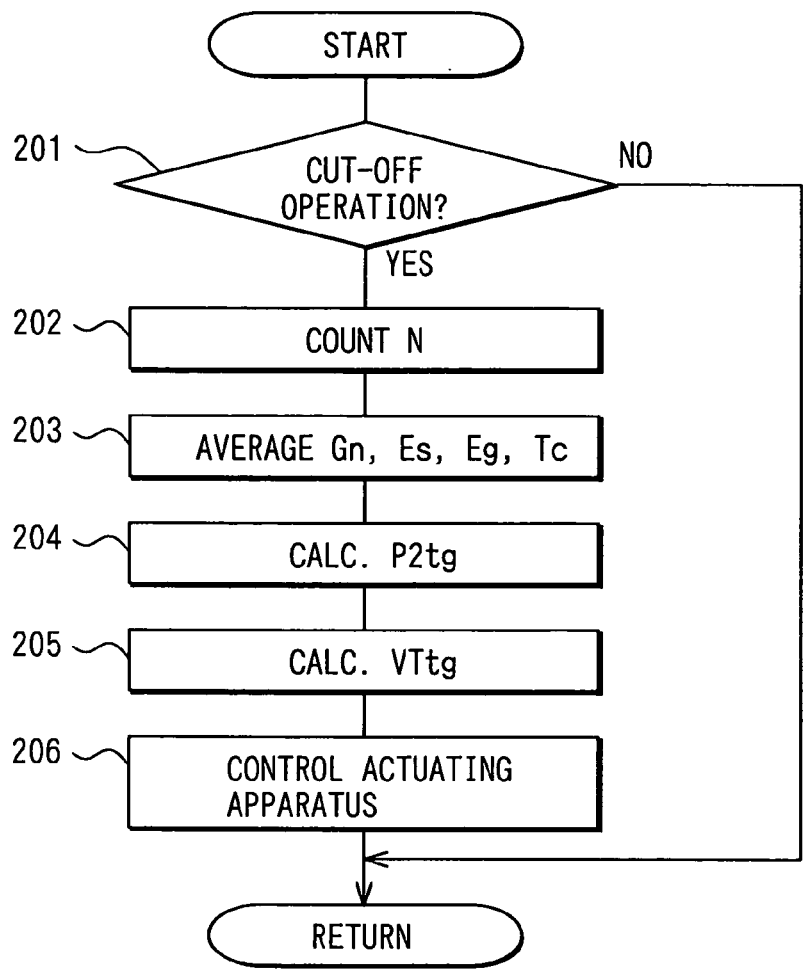
FIG. 9 is a flow chart showing a flow of processing steps of a variable valve operating amount control program for halted cylinders in accordance with the second embodiment of the present invention.
FIG. 10 is a map conceptually showing target maximum internal pressure P2 of a halted cylinder.

For example, in case the target maximum internal pressure P2$tg$ of the halted cylinder is calculated based on the two parameters of the load of the combustion cylinder Gn and the ignition timing of the combustion cylinder Es, the target maximum internal pressure P2$tg$ of the halted cylinder is calculated corresponding to the load of the combustion cylinder Gn and the ignition timing of the combustion cylinder Es with a map shown in FIG. 10 or a formula.

The map or the formula is previously made after finding a relationship between those parameters described above and the target maximum internal pressure P2$tg$ of the halted cylinder from experiments, simulation and so on, and stored in the ROM of the ECU 23.

Figure 6:
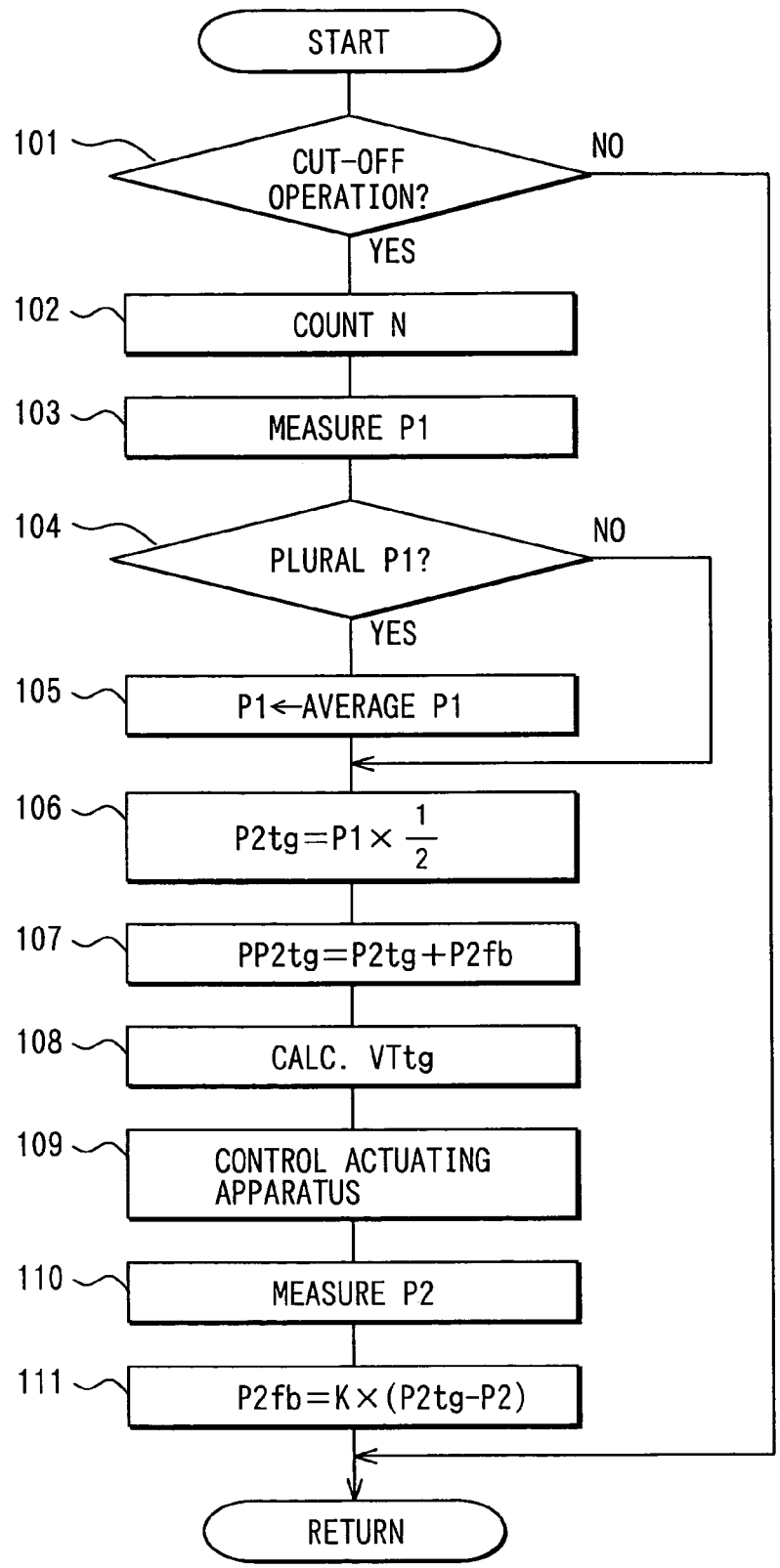
FIG. 6 is a flow chart showing a flow of processing steps of a variable valve operating amount control program for halted cylinders in accordance with the first embodiment of the present invention.

After that, the process advances to step 205 to calculate the target valve closed timing VTtg of the exhaust valve 15 in intake stroke of the halted cylinder in accordance with the engine speed Ne, the load of combustion cylinder Gn and the target maximum internal pressure P2$tg$ of the halted cylinder in the same manner of step 108 in FIG. 6 explained in the first embodiment.

In this manner, after the calculation of the target valve closed timing VTtg of the exhaust valve 15 in intake stroke of the halted cylinder, the process advances to step 206 to control the electromagnetic actuating apparatus 17 of the exhaust valve so that the valve closed timing VT of the exhaust valve 15 in intake stroke of the halted cylinder corresponds to the target valve closed timing VTtg.

According to the second embodiment explained above, it is possible to control the maximum internal pressure P2 of the halted cylinder to the proper internal pressure in accordance with the engine operating state during the cylinder cut-off operation, and obtain stable vibration-reduction effect regardless of the operating state of the internal combustion engine.

In addition, according to the second embodiment, since the target maximum internal pressure P2$tg$ (=proper internal pressure) of the halted cylinder is calculated, without using detected values of the internal pressure sensor 20, based on at least one of the number of the halted cylinders during the cylinder cut-off operation, the load of the combustion cylinder, the ignition timing of the combustion cylinder, the EGR amount of the combustion cylinder, the information related to the EGR amount of the combustion cylinder, the engine temperature and the information related to the engine temperature, and the target valve closed timing VTtg of the exhaust valve 15 of the halted cylinder is set based on the target maximum internal pressure P2$tg$, it is possible to apply to the system which has no internal pressure sensor.

In the above first and second embodiment, the valve closed timing of the exhaust valve 15 in intake stroke of the halted cylinder during the cylinder cut-off operation is changed though, at least one of the valve opened timing of the exhaust valve 15 in intake stroke of the halted cylinder, valve lift amount, operational angle and lift curve may be changed. Furthermore, the variable valve operating amount (valve timing, valve lift amount, operational angle and lift curve) of the exhaust valve 15 in exhaust stroke of the halted cylinder may be changed.

In addition, in the above first and second embodiment, the intake valves 13 of the halted cylinder is maintained at a closed position in all of the strokes and the exhaust valves of the halted cylinder is opened in intake stroke during the cylinder cut-off operation though, the variable valve operating amount of the intake valves of the halted cylinder may be changed in such a manner that the exhaust valves 15 of the halted cylinders are maintained at a closed position in all of the strokes and the intake valves 13 of the halted cylinder is opened in intake stroke during the cylinder cut-off operation.

In addition, the exhaust valves 15 (or intake valves 13) are opened at every cycle of the engine though, it may be changed the control frequency in the region where the target internal pressure is satisfied, for example opening the valve once at a plurality of cycles of the engine (e.g. two cycles). Furthermore, the exhaust valves 15 or the intake valves 13 of the halted cylinder are opened in intake stroke though, they may be opened in expansion stroke or in both of intake stroke and expansion stroke. In this manner, in case the variable valve operating amount of intake stroke and/or expansion stroke is controlled, the valves are controlled within a relatively long period which is from the top dead center through the bottom dead center. Therefore, even if there is a mechanical delay, it is possible to relatively control the variable valve operating amount precisely.

In short, while one of the intake valves and the exhaust valves of the halted cylinders are to be maintained at a closed position during the cylinder cut-off operation, the actual variable valve operating amount of the other valves are to be controlled based on the target variable valve operating amount of the halted cylinder. Consequently, it is possible to stop emitting intake air from an intake pipe to an exhaust pipe though the halted cylinder and to prevent increase of Nitrogen Oxides (NOx) emission amount.

In addition, in the above first and second embodiment, target valve closed timing of the exhaust valves 15 of the halted cylinders are controlled at the same timing when a plurality of halted cylinders are existing though,they may be independently controlled. In short, it may be controlled so that the maximum value of the combined waveform of the internal pressures of the halted cylinders corresponds to maximum internal pressure of one combustion cylinder.

In addition, in the above first embodiment, the target internal pressure of the halted cylinder is set based on the maximum internal pressure of the combustion cylinder and the target variable valve operating amount of the halted cylinder is set based on the target internal pressure of the halted cylinder and the variable valve operation mechanism of the halted cylinder is controlled so that an actual variable valve operating amount of the halted cylinder corresponds to the target variable valve operating amount of the halted cylinder though, the target internal pressure of the halted cylinder may be set based on the maximum internal pressure of the combustion cylinder and the variable valve operation mechanism of the halted cylinder may be controlled so that an actual internal pressure of the halted cylinder corresponds to the target internal pressure of the halted cylinder. Furthermore, the target variable valve operating amount of the halted cylinder may be set based on the maximum internal pressure of the combustion cylinder and the variable valve operation mechanism of the halted cylinder may be controlled so that the actual variable valve operating amount of the halted cylinder corresponds to the target variable valve operating amount of the halted cylinder during the cylinder cut-off operation.

In addition, in the above second embodiment, the target internal pressure of the halted cylinder is set based on the operating state of the engine and the target variable valve operating amount of the halted cylinder is set based on the target internal pressure of the halted cylinder and the variable valve operation mechanism of the halted cylinder is controlled so that an actual variable valve operating amount of the halted cylinder corresponds to the target though, the target internal pressure of the halted cylinder may be set based on the operating state of the engine and the variable valve operation mechanism of the halted cylinder may be controlled so that the actual internal pressure of the halted cylinder corresponds to the target internal pressure of the halted cylinder during the cylinder cut-off operation. Furthermore, the target variable valve operating amount of the halted cylinder may be set based on the operating state of the engine and the variable valve operation mechanism of the halted cylinder may be controlled so that the actual variable valve operating amount of the halted cylinder corresponds to the target variable valve operating amount of the halted cylinder during the cylinder cut-off operation.

In addition, in the above first and second embodiment, the electromagnetic actuating apparatuses which directly actuate the intake valves 13 and exhaust valves 15 by electromagnetic power of solenoid are provided as a variable valve operation mechanism which actuates intake valve 13 and exhaust valve 15 though, a variable valve operation mechanism which changes a phase of a cam shaft against a crank shaft by oil pressure or motor may be provided.

In addition, this invention may be applied, not limited to four-cylinder engines, but to less than four-cylinder or more than four-cylinder engines. Additionally, this invention may be applied, not limited to in-line engines, but to V-type engines or horizontally opposed engines. Furthermore, this invention may be applied, not limited to intake port injection type engines, but to cylinder injection of fuel type engines.

The present invention should not be limited to the disclosed embodiments, but may be implemented in other ways without departing from the spirit of the invention.

What is claimed is:

1. A control apparatus for an internal combustion engine, said control apparatus comprising:
    cylinder cut-off operation means for performing a cylinder cut-off operation which halts fuel injection for a halted cylinder and continues fuel injection for a combustion cylinder;
    variable valve operation mechanism for changing the magnitude of valve opening for at least one of an intake valve and an exhaust valve;
    means for setting a target variable valve opening magnitude for the haled cylinder based on an operating state of the engine during cylinder cut-off operation; and
    means for controlling actual variable valve opening magnitude of the halted cylinder by controlling the variable valve operation mechanism based on the target variable valve magnitude for the halted cylinder.

2. The control apparatus for the internal combustion engine of claim 1, wherein:
    the means for controlling controls actual variable valve opening magnitude of one of an intake valve and an exhaust valve of the halted cylinder based on the target variable valve opening magnitude of the halted cylinder while maintaining the other valve of the halted cylinder at a closed position during cylinder cut-off operation.

3. The control apparatus for the internal combustion engine of claim 1, wherein:
    the means for setting sets the target variable valve opening magnitude of the halted cylinder based on internal pressure of the combustion cylinder during cylinder cut-off operation.

4. The control apparatus for the internal combustion engine of claim 3, further comprising:
- a first internal pressure sensor for detecting the internal pressure of a combustion cylinder during cylinder cut-off operation, and
- a second internal pressure sensor for detecting internal pressure of a halted cylinder during cylinder cut-off operation,
- wherein, the means for setting calculates a target internal pressure of a halted cylinder based on the internal pressure of a combustion cylinder detected by the first internal pressure sensor and sets the target variable valve opening magnitude of the halted cylinder so that the internal pressure of the halted cylinder detected by the second internal pressure sensor corresponds to the target internal pressure of the halted cylinder during cylinder cut-off operation.

5. The control apparatus for the internal combustion engine of claim 1, wherein:
- the means for setting sets the target variable valve opening magnitude of a halted cylinder based on at least one of: (a) the number of the halted cylinders, (b) a load of the combustion cylinder, (c) an ignition timing of the combustion cylinder, (d) an exhaust gas recirculation amount of the combustion cylinder, (e) information related to the exhaust gas recirculation amount, and (f) an engine temperature and information related to the engine temperature during cylinder cut-off operation.

6. The control apparatus for the internal combustion engine of claim 5, wherein:
- the means for setting calculates a target internal pressure of the halted cylinder based on at least one of: (a) the number of the halted cylinders, (b) a load of the combustion cylinder, (c) an ignition timing of the combustion cylinder, (d) an exhaust gas recirculation amount of the combustion cylinder, (e) information related to the exhaust gas recirculation amount, and (f) an engine temperature and information related to the engine temperature, and sets the target variable valve opening magnitude of the halted cylinder based on the target internal pressure of the halted cylinder during cylinder cut-off operation.

7. A control apparatus for an internal combustion engine said control apparatus comprising:
- means for performing a cylinder cut-off operation which halts fuel injection for a halted cylinder and continues fuel injection for a combustion cylinder;
- variable valve operation mechanism for changing valve opening magnitude for at least one of an intake valve and an exhaust valve;
- valve control means for controlling the variable valve operation mechanism of the halted cylinder based on an operating state of the engine during cylinder cut-off operation; and
- wherein the valve control means sets a target internal pressure of the halted cylinder based on the operating state of the engine, and controls the variable valve operation mechanism of the halted cylinder so that internal pressure of the halted cylinder corresponds to the target internal pressure of the halted cylinder during cylinder cut-off operation.

8. A control apparatus for an internal combustion engine, said control apparatus comprising:
- means for performing a cylinder cut-off operation which halts fuel injection for a halted cylinder and continues fuel injection for a combustion cylinder;
- variable valve operation mechanism for changing valve opening magnitude for at least one of an intake valve and an exhaust valve;
- valve control means for controlling the variable valve operation mechanism of the halted cylinder based on an operating state of the engine during cylinder cut-off operation; and
- wherein the valve control means sets a target variable valve opening magnitude of the halted cylinder based on the operating state of the engine, and controls the variable valve operation mechanism of the halted cylinder so that an actual variable valve opening magnitude of the halted cylinder corresponds to the target variable valve opening magnitude of the halted cylinder during cylinder cut-off operation.

9. The control apparatus for the internal combustion engine of claim 8, wherein:
- the valve control means controls the variable valve operation mechanism of the halted cylinder so that the actual variable valve opening magnitude of the halted cylinder corresponds to the target variable valve opening magnitude of the halted cylinder in a stroke corresponding to an intake stroke and/or an expansion stroke in the period when the halted cylinder is not in a halted state.

10. A control apparatus for an internal combustion engine, said control apparatus comprising:
- means for performing a cylinder cut-off operation which halts fuel injection for a halted cylinder and continues fuel injection for a combustion cylinder;
- variable valve operation mechanism for changing valve opening magnitude for at least one of an intake valve and an exhaust valve;
- valve control means for controlling the variable valve operation mechanism of the halted cylinder based on an operating state of the engine during cylinder cut-off operation; and
- wherein the valve control means sets a target internal pressure of the halted cylinder based on the operating state of the engine, and sets a target variable valve opening magnitude of the halted cylinder based on the target internal pressure of the halted cylinder, and controls the variable valve operation mechanism of the halted cylinder so that an actual variable valve opening magnitude of the halted cylinder corresponds to the target variable valve opening magnitude of the halted cylinder.

11. A control apparatus for an internal combustion engine, said control apparatus comprising:
- means for performing a cylinder cut-off operation which halts fuel injection for a halted cylinder and continues fuel injection for a combustion cylinder;
- variable valve operation mechanism for changing a valve opening magnitude for at least one of an intake valve and an exhaust valve;
- valve control means for controlling the variable valve operation mechanism of the halted cylinder based on a maximum internal pressure of the combustion cylinder during cylinder cut-off operation;
- wherein the valve control means sets a target internal pressure of the halted cylinder based on the maximum internal pressure of the combustion cylinder, and controls the variable valve operation mechanism of the halted cylinder so that internal pressure of the halted cylinder corresponds to the target internal pressure of the halted cylinder duringhe cylinder cut-off operation.

12. A control apparatus for an internal combustion engine, said control apparatus comprising:
- means for performing a cylinder cut-off operation which halts fuel injection for a halted cylinder and continues fuel injection for a combustion cylinder;
- variable valve operation mechanism for changing a valve opening magnitude for at least one of an intake valve and an exhaust valve;
- valve control means for controlling the variable valve operation mechanism of the halted cylinder based on a maximum internal pressure of the combustion cylinder during cylinder cut-off operation;
- wherein the valve control means sets a target variable valve opening magnitude of the halted cylinder based on the maximum internal pressure of the combustion cylinder, and controls the variable valve operation mechanism of the halted cylinder so that an actual variable valve opening magnitude of the halted cylinder corresponds to the target variable valve opening magnitude of the halted cylinder during cylinder cut-off operation.

13. The control apparatus for the internal combustion engine of claim 12, wherein:
- the valve control means controls the variable valve operation mechanism of the halted cylinder so that the variable valve opening magnitude of the halted cylinder corresponds to the target variable valve opening magnitude of the halted cylinder in a stroke corresponding to an intake stroke and/or expansion stroke in the period when the halted cylinder is not in a halted state.

14. A control apparatus for an internal combustion engine, said control apparatus comprising:
- means for performing a cylinder cut-off operation which halts fuel injection for a halted cylinder and continues fuel injection for a combustion cylinder;
- variable valve operation mechanism for changing a valve opening magnitude for at least one of an intake valve and an exhaust valve;
- valve control means for controlling the variable valve operation mechanism of the halted cylinder based on a maximum internal pressure of the combustion cylinder during cylinder cut-off operation;
- wherein the valve control means sets a target internal pressure of the halted cylinder based on the maximum internal pressure of the combustion cylinder, and sets a target variable valve opening magnitude of the halted cylinder based on the target internal pressure of the halted cylinder, and controls the variable valve operation mechanism of the halted cylinder so that an actual variable valve opening magnitude of the halted cylinder corresponds to the target variable valve opening magnitude of the halted cylinder.

* * * * *